Sept. 30, 1969  H. SCHENCK ET AL  3,469,969
PROCESS FOR REDUCING IRON ORES
Filed Oct. 23, 1965  4 Sheets-Sheet 1

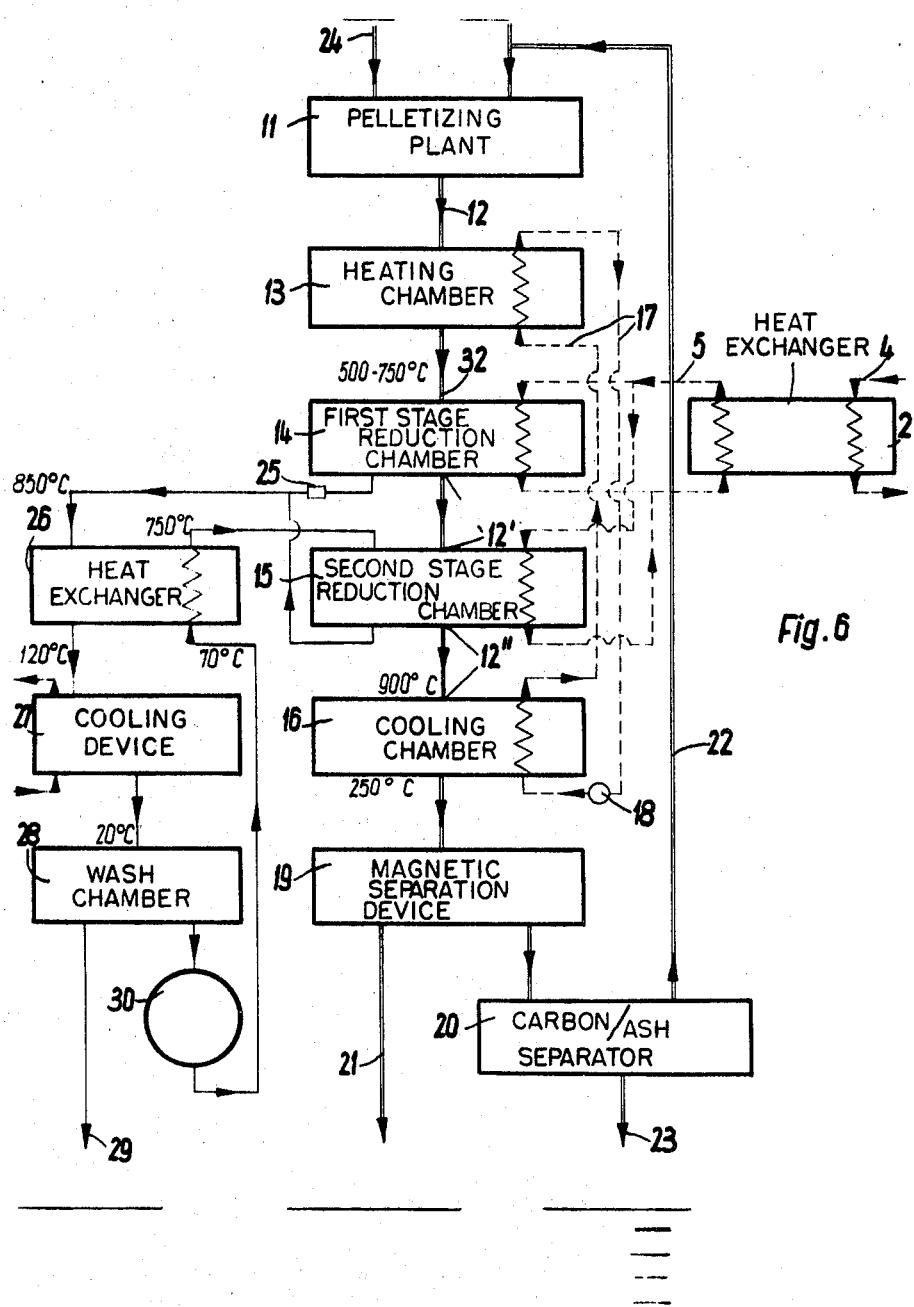

United States Patent Office 3,469,969
Patented Sept. 30, 1969

3,469,969
PROCESS FOR REDUCING IRON ORES
Hermann Schenck, Intzestrasse 1, Aachen, Germany;
Werner Wenzel, Prinz-Heinrich-Strasse 29, Aachen,
Germany; and Franz-Rudolf Block, Kalfstrasse,
Rotgen, Germany
Filed Oct. 23, 1965, Ser. No. 503,601
Claims priority, application Germany, May 25, 1965,
Sch 37,124; June 18, 1965, Sch 37,249
Int. Cl. C21b 1/10; C21c 5/38
U.S. Cl. 75—26                                    9 Claims

ABSTRACT OF THE DISCLOSURE

Process for the reduction of iron ore by a reducing agent in which heat produced in an atomic reactor is transferred to the ore and reducing agent by a coolant for the reactor. The reduction is effected in two reaction zones in which the ore is successively reduced, the reduction being achieved to a degree of completion of about 40 to 75% in the first stage, whereas the residual oxygen content at the end of the second stage is about 5 to 15%. The first reduction stage is carried out at elevated pressure and the produced gas is washed to yield a reducing gas which is used in the second stage.

---

The present invention relates to methods and apparatus for the utilization of the heat of an atomic reaction in a reactor.

The economic use of the heat of an atomic reaction is adversely affected by the losses which occur during the conversion of said heat into electrical energy. On the other hand, the possibility of directly using atomic heat is rendered difficult by the fact that a reactor constructed to produce energy at low cost always produces very large amounts of heat which have to be removed from the reactor by a coolant, and in that the heat can be made available only at a limited temperature level. Moreover, the direct utilization of atomic heat is not feasible due to the possible damage which may be caused by radiation brought about by the coolant of the reactor.

It has now been found that a very advantageous process, which overcomes the above-mentioned difficulties for the direct utilization of atomic heat, consists in carrying out the reduction of iron ores by directly utilizing atomic heat. According to the invention, said process is carried out as follows:

The material to be reduced, such as iron ore, sinter or the like, is heated in a special reduction chamber by means of an auxiliary heat transfer medium, which is heated in a special heat exchanger by a coolant which is cycled through the reactor.

The reducing agents used may be solid agents, such as coal and coke; or liquid agents, such as oil; or gaseous agents, such as carbon monoxide, hydrogen and hydrocarbon gas mixtures thereof.

First of all, such a process meets the condition that it requires the necessary very large amounts of heat which are to be utilized in the smallest units of economically operating reactors. Such reactors are, for example, of the order of magnitude of 500 megawatts. The resulting amount of heat is of the order of magnitude of the heating requirements of large smelting works for the reduction of iron ore. Moreover, according to the development of the invention, such a process may be carried out in such a manner that it operates at the limited temperature level of the atomic reactor. The peak temperatures of atomic reactors on the coolant side are, at the present time, slightly above 500° C. Temperatures of about 700° C. can dependably be expected if sodium-cooled reactors are used. Still higher coolant peak temperatures will be obtained with gas-cooled reactors in the forseeable future.

The difficulty of radiation damage due to the coolant is avoided, in the process according to the invention, in that the reactor coolant transfers its heat to the heat absorbent auxiliary medium in a heat exchanger, said auxiliary medium, which may be, for example, carbon monoxide gas or a mixture of carbon monoxide and carbon dioxide, being so selected that secondary radiation damage is excluded.

A further development of the invention relates to reactor cooling systems which operate with a non-radiating cooling medium or with a cooling medium whose radiating properties are eliminated when they reach the place where the heat of the coolant is utilized or which are prevented from having a harmful effect.

The auxiliary medium may either be brought into direct contact with the mixture to be reduced in the reduction chamber for the purpose of heat transfer, for example, in counterflow heat exchange, or it may be guided through the reduction chamber by means of a pipe system, for example, also in counterflow heat exchange, so that it has no direct contact with the material to be reduced. In order to make the heat transfer as intensive as possible with lowest drops in temperature between the heating side and the cooling side of the heat exchanger, the process according to the invention may use, instead of gas, a heat absorbent auxiliary media having a high thermal capacity per unit volume, for example, liquids such as liquid metals or liquid metal alloys; the latter preferably being sodium-potassium alloys.

Gaseous heat transfer media may also be used with a density increased by excess pressure, for example, by a pressure of 10 atmospheres.

Additional important features of the present invention consist in the development of a special iron ore reducing process which insures a sufficiently high reaction velocity to make efficient operation possible at the available temperature level between about 500 and 700° C. or at a higher upper temperature limit corresponding to the respective coolant peak temperature which can be obtained, for example, with gas-cooled reactors. In the low-temperature reducing process the reaction material, i.e. the iron ore and solid reducing agents such as coal or coke if used, are of small grain size. In order to obtain a favorable heat transfer from the auxiliary medium to the reaction material in spite of the fine granulation of the latter, two different measures are provided for. One measure consists in that the reduction is carried out in a fluidized bed according to a special embodiment of the invention. Said embodiment consists in that the heat transfer surfaces are arranged within the fluidized bed. This arrangement insures that the reaction proceeds quickly owing to the fine granulation of the reaction material, and that the amount of heat required thereby is available owing to the favorable transfer conditions from the auxiliary medium to the fluidized bed. The grain size of the reaction material in the fluidized bed is expediently in the range from about 0 to 0.5 mm., with the size of most of the grains ranging between about 0.06 and 0.2 mm. The turbulence of the bed in the reduction chamber is brought about by the reaction gas originating from the reduction of the iron oxide with the carbon or from the coupled reactions of the iron ore reduction by carbon monoxide and the carbon dioxide reduction by the carbon. However, according to the invention, the turbulence may also be brought about or assisted by blowing an auxiliary gas into the bottom portion of the reduction chamber. Such reducing gas may be obtained by recycling portions of the reaction gas escaping at the upper end of the reaction chamber. Additionally, the turbulence may be brought about or assisted by mechanical means, for example, by the use of stirring members in the reduction chamber.

In another method of carrying out the low-temperature reduction of the iron ore according to the invention, the fine-grained material to be reduced, which is preferablyy a mixture of material to be reduced and non-gaseous reducing agents, is transformed into pellets or discrete pieces prior to being introduced into the reduction chamber. This can be done by known processes, such as briquetting, pelleting, and the like. This material, which is present, for example, in the form of pea-size particles, is arranged as a fixed bed in the reduction chamber and is heated. Said fixed bed may be at rest, if the process is a discontinuous chamber process, or the entire bed may be moved if the process is a continuous shaft furnace process.

If the reaction mixture is heated indirectly by means of the auxiliary medium, the pelletized reaction material is expediently located in the space between the pipes or heating unit through which the heating medium flows. In order to obtain a very intensive heat transfer at the fixed or only slowly moving material to be reduced, it is preferred to provide the heat transfer pipe, in case of a vertical arrangement in the reduction chamber, with vertical ribs. A particularly advantageous solution with a view to insuring good heat transfer consists in that the heat transfer pipes are disposed horizontally in the reduction chamber and that a large number of parallel vertical metallic laminae (metal sheets, discs or fins) are arranged perpendicularly to said pipes. Between said laminae which may be spaced, for example, at 20 mm. intervals, is the material to be heated which is introduced between the laminae from above and is withdrawn therefrom at the bottom.

The above-described embodiments of the process according to the invention are explained in detail by way of the attached drawing, wherein:

FIGURE 6 is a diagrammatic illustration of the operation of a third embodiment of the invention.

Figure 1:
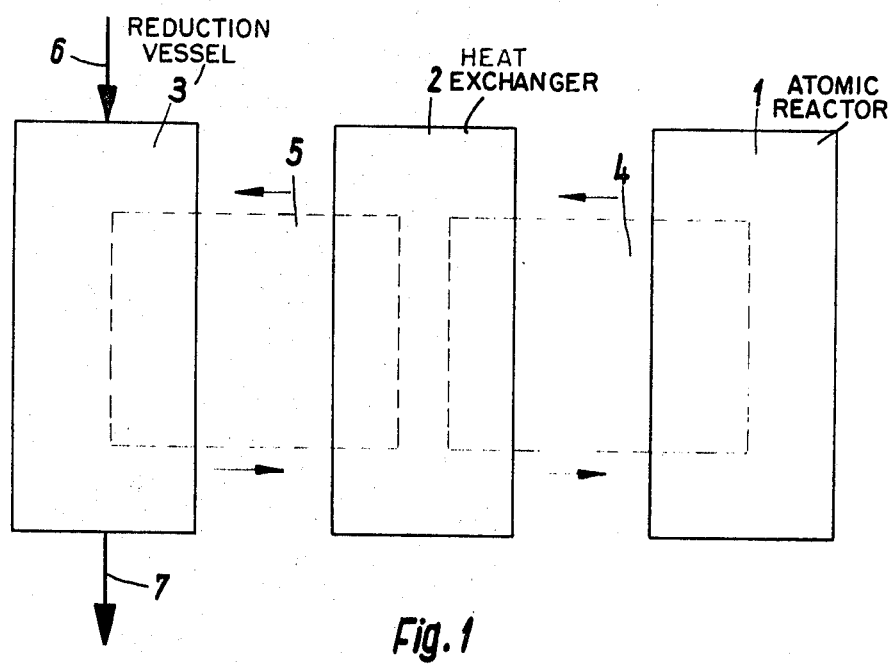
FIGURE 1 is a diagrammatic illustration of the operation of a first embodiment of the invention.

Referring now to FIG. 1, therein is shown an atomic reactor 1, a heat exchanger 2, and a reduction vessel 3. Between the atomic reactor 1 and the heat exchanger 2 exists a transfer device 4 for cycling a reactor coolant, which may, for example, be liquid sodium or a sodium alloy. Said reactor coolant, which is moved, for example, in the direction of the arrows, absorbs the heat released during the atomic fission in the reactor 1 and delivers said heat in the heat exchanger 2 to a heat absorbent auxiliary medium. In the illustrated embodiment, there also exists a device 5 for the cycling of the heat absorbent auxiliary medium, which is moved in the direction of the arrows. The reaction mixture, which consists of iron ore and coal or coke, is introduced into the reduction vessel at 6 and is withdrawn therefrom at 7 after the reduction has taken place.

It is further provided that the reaction material be introduced into the reduction vessel 3 in a pre-heated state. More particularly, the waste heat, which is withdrawn from the reduction vessel, is used for preheating the material. For example, the waste gases escaping from the reduction vessel may be used to preheat the ore and the coal or coke in counterflow. In order also to utilize the waste heat of the solid reaction product, it is necessary to use a heat transferring auxiliary medium, for example, carbon monoxide gas. Said auxiliary medium is first guided in countercurrent with the reaction product which leaves the reduction vessel, said reaction product being at a temperature of about 600° C. or above. The auxiliary medium is heated to a temperature of about 500° C. or above by the reaction product. The hot carbon monoxide auxiliary gas is then guided in countercurrent with the incoming reaction mixture to the vessel 3 to heat such mixture to a temperature of about 400° C. or above.

An improvement of the process according to the invention, which results in a better utilization of the reactor heat, consists in combining the iron ore reducing process with other heat-consuming processes. Thus, after the reducing process which requires higher temperatures is completed, the reactor heat which is below the temperature required for the reduction can be utilized to a great extent.

Such processes include, for example, the generation of energy by means of power engines, such as steam turbines and gas turbines; drying processes and calcination processes, in which water vapor or carbon dioxide or other gaseous constituents are expelled by heat consumption; the conversion of salt water into fresh water by evaporation; and other processes.

Various embodiments will be effective to achieve this purpose. For example, the reactor cooling medium may yield its heat successively, first at a high temperature level, to a heating medium for the reduction of iron ore and, then, to another heating medium for the sequentially connected process, for example, the generation of steam. Various exchange processes and constructions are available for the heat exchange. The heat exchanger may be of a type which is traversed by the reactor coolant on the heating side, while it comprises, on the cooling side, different pipe systems for the heat transfer medium used for the reduction of iron ore and for the heat transfer medium used for the sequentially connected process. This embodiment is diagrammatically illustrated in FIG. 2 in which the same elements as in FIG. 1 have been given the same reference numerals.

Figure 2:
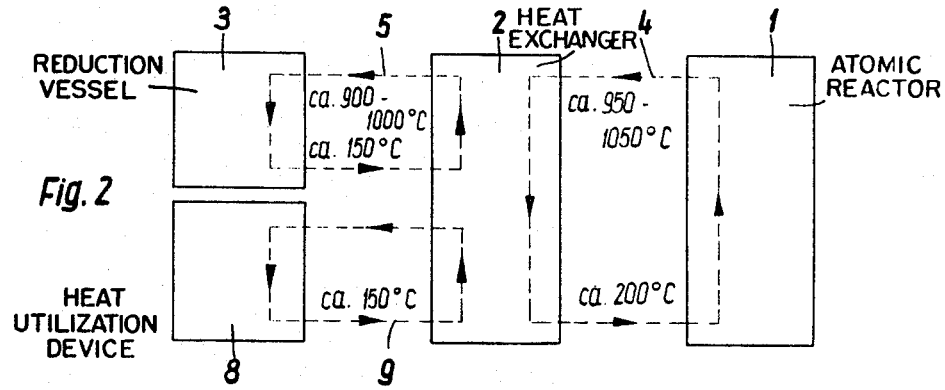
FIGURE 2 is a diagrammatic illustration of a modification of the embodiment of FIG. 1.

In FIG. 2 there is shown the atomic reactor 1, the heat exchanger 2, and the reaction vessel 3 for carrying out the reduction of iron ore. Also shown is apparatus 8 for the utilization of low temperature heat, for example, a steam boiler. The device 4 for the recycling of the reactor coolant, which is the heating medium for the heat exchanger 2, couples the atomic reactor 1 and the heat exchanger 2. At the upper temperature level, the device 5 for the heat exchanging medium couples the heat exchanger 2 and the reaction vessel for carrying out the iron ore reduction in vessel 3. At the lower temperature level, a device 9 for cycling the heat exchanging medium couples the heat exchanger 2 and the apparatus 8 for utilizing low temperature heat.

In a manner known per se, conveying members (not shown in the drawing) are inserted in the devices for the recycling of the heat exchanging medium at the lower temperature levels. Known separating members for removing undesirable substances from the cycled media are also not shown in the drawing.

Figure 3:
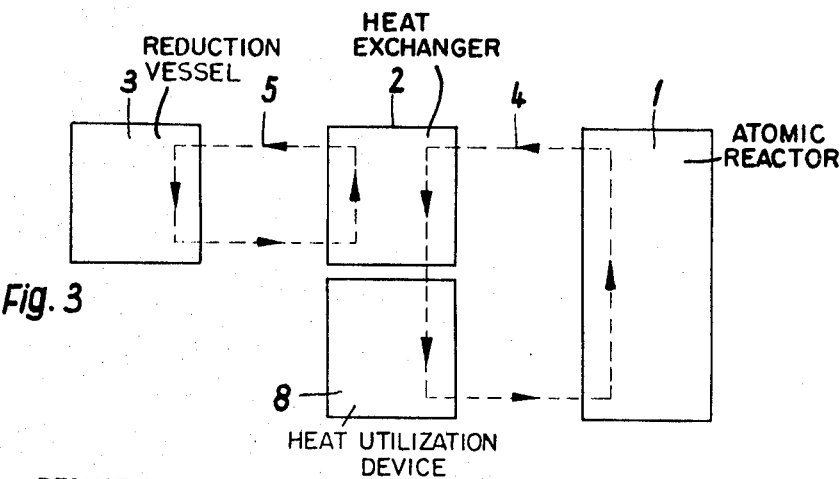
FIGURE 3 is a diagrammatic illustration of another modification of the embodiment of FIG. 1.

FIG. 3 illustrates another mode of utilizing the reactor cooling heat in accordance with the invention. Again, the heat of the atomic reactor 1 is transferred in a heat exchanger 2, in the upper temperature level, by the reactor coolant 4 to the heat transporting medium 5, which transfers its heat in the reaction vessel 3 to the reaction mixture therein to effect the iron ore reducing process. In the lower temperature range, on the other hand, the reactor coolant 4 transfers its heat directly to a heat consuming process, for example, to the steam boiler 8.

Figure 4:
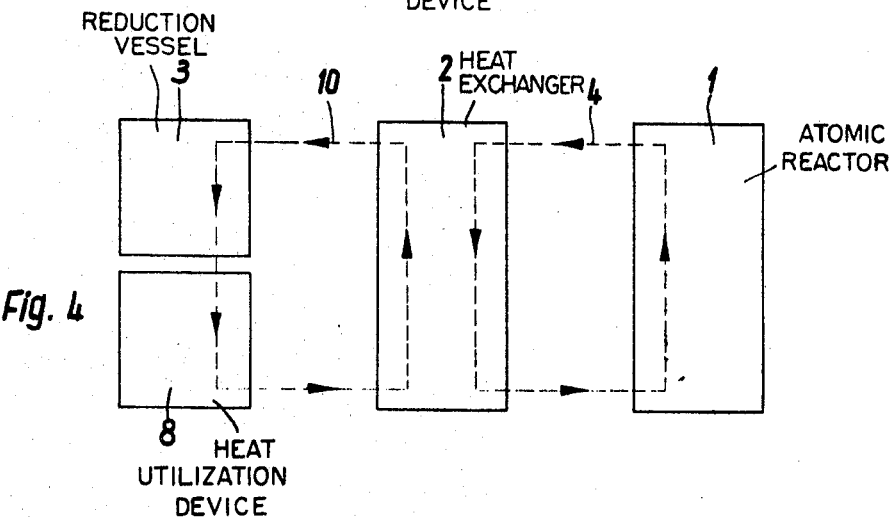
FIGURE 4 is a diagrammatic illustration of a further modification of the embodiment of FIG. 1.

In the process according to the invention, as illustrated in FIG. 4, the difference with respect to the process according to FIG. 2 consists in that, instead of two heat exchanging recycle devices 5 and 9 being used between the heat exchanger 2, the reaction vessel 3 and the apparatus 8, a single heat transporting device 10 is used, by means of which the heat exchanging medium first travels through the reaction vessel 3 at a higher temperature level and, then, through the heat utilizing apparatus 8. This arrangement is particularly advantageous in processes where the apparatus are closely coupled; this is the case, for example, when the heat utilizing apparatus 8 is a drying and preheating installation for the material to be reduced in the reaction vessel 3.

Figure 5:
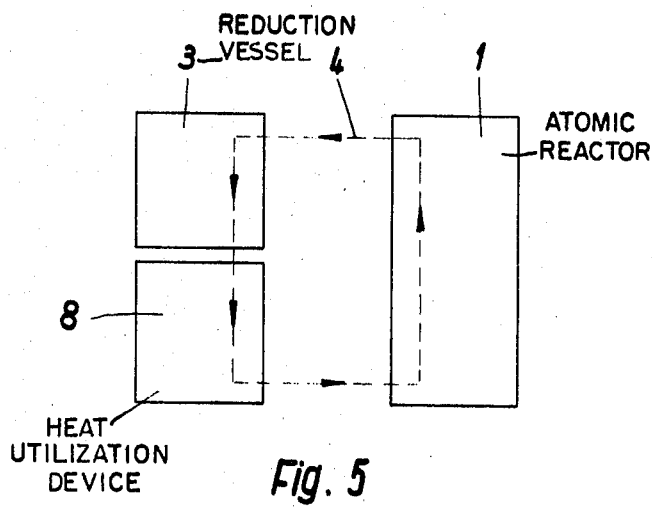
FIGURE 5 is a diagrammatic illustration of the operation of a second embodiment of the invention.

The process diagrammatically illustrated in FIG. 5 represents a particularly close coupling between the atomic reactor and the sequentially arranged heat utilizing processes. In this case, the reactor coolant travels successively directly through the reaction vessel 3 and the heat utilizing apparatus 8, for example, a steam boiler. If the invention is used in this manner, it is expedient to avoid the transfer of undesirable radiating substances into the sequentially connected processes by special measures, for example, by subjecting the heat exchanging medium in the recycle device 4 to extremely fine purification. Moreover, when effecting the method according to FIG. 5, measures are taken on the heat removal side, i.e., in the region of the reaction vessel 3 and of the apparatus 8, that radiating substances, possibly present in the medium cycled, be unable to exert any unfavorable effects. Such measures may, for example, consist in maintaining a higher pressure in the sequentially connected apparatus 3 and 8 than in the recycle device 4, so that, in case of leakages in the device 4, the cycled medium is unable to escape into the apparatus 3 and 8.

These embodiments including the utilization of heat below the reducing temperature offer the following additional advantages:

Smaller amounts of coolant are required in the atomic reactor, whereby the expenditures is reduced in known manner. The movement of the heat exchanging media in the different heat transfer recycle devices requires conveying members which operate more advantageously, the lower the temperatures at which the conveying can be carried out. For example, the modified embodiment of the invention according to FIGS. 4 and 5 is superior to that according to FIGS. 2 and 3 in that, in the first mentioned embodiments, the recycle device 5 is omitted, in which a conveying of the cycled medium in the range of the lower temperature limit of the iron ore reduction is necessary.

Additional advantages reside in the fact that it is possible to utilize the constant amount of energy produced by the atomic reactor to a greater or lesser degree for the production of energy, depending on requirements.

As already mentioned above, in the iron ore reducing process according to the invention, the temperature level at which the reactor cooling heat is available, is comparatively low with respect to the conventional iron ore reduction process. Although it is possible to utilize said heat for the reduction of iron ore at a temperature between about 500° C. and about 1000° C., nevertheless, in this range, solid reducing agents i.e., coal, coking products of coals, carbon separated from petroleum and gases, and the like, are comparatively slow to react. This is the reason why iron ore reduction processes, which operate with solid carbon products as the reducing agent, are normally carried out at temperatures in excess of 1000° C.

It is of great advantage for the processes according to the invention if they are carried out as two-stage reducing processes. This result may be achieved by sequentially arranging a so-called "direct" reduction and a so-called "indirect" reduction on the same iron ore, or else, by first transforming the fuel by means of $CO_2$ and/or $H_2O$ into a reducing gas and by then reacting said reducing gas with the iron ore.

The special peculiarity of the first two-stage reducing process consists in that the iron ore reduction is carried out with solid carbon products, by using reactor heat in the above-mentioned temperature range, to reduction degrees of the iron ore of about 40% to 75% only. The final reduction of the ore, i.e., to a degree of reduction desirable for its further use, generally up to between 85% and 95%, is carried out subsequent to the reduction with solid carbon products expediently at the same temperature, by means of reducing gases, such as carbon monoxide and hydrogen.

This method makes it possible to carry out the reduction of the ore rapidly by means of the solid carbon at the above-mentioned low temperatures, so as to obtain a technically and economically high-quality process. On the other hand, the final reduction by means of reducing gases proceeds rapidly, even in temperature ranges of up to 900° C. to allow favorable utilization of the reaction chamber. The degree of reduction obtained in the first reduction stage depends mainly on the reactivity of the fuel used. For example, anthracite or high temperature coke will preferably be used at the lower limit of said degree of reduction, while it is expedient to work with charcoal or with carbon obtained from carbon monoxide decomposition, in order to obtain the upper limit of said degree of reduction.

The reducing gas for the second reduction stage may originate from various sources. It may be obtained from solid fuels, from petroleum, natural gas and other fuels from nature. Moreover, it is possible to use waste gases from other processes, such as the waste gases of oil refineries and of metallurgical furnaces. According to the invention, it is particularly expedient to use carbon monoxide containing waste gas from electric smelting furnaces for the second reduction stage of the already partly reduced iron ore according to this process.

Another important modification for carrying out the second reduction stage of the iron ore which has been partly reduced in the first reduction stage consists in using electrolytic hydrogen for this purpose. This method offers advantageous possibilities for utilizing atomic power plants economically. Since the demand for power from such atomic power plants is subject to fluctuations during the day, the electrolytic hydrogen can advantageously be produced during hours of insufficient heat demand by the system and can be stored in order to be supplied uniformly for the purposes of reducing iron ore.

Of special advantage is another aspect of the method according to the invention, in which the reducing gas for the second reduction stage is obtained from the waste gas of the first stage.

As is known, due to conditions of equilibrium, the waste gas produced in the first reduction stage is a mixture of carbon monoxide as well as hydrogen and steam. If the carbon dioxide and the steam are eliminated from said waste gas, an excellent reducing gas for the second reduction stage is obtained. Carbon dioxide and steam may be removed in various known ways. According to processes most suitable for this purpose, the gas mixture is supercooled and is treated with a wash liquid which absorbs the gases to be removed. The cooling of the gas is expediently carried out in a heat exchanger, and the reducing gas, from which carbon dioxide and steam have been removed, is simultaneously heated again in countercurrent to the reducing temperature. The washing of the gas may also be carried out, for example, by means of pressure water at a gas pressure between about 5 and 25 atm. Such a process normally has the disadvantage that a high amount of energy must be expanded for the production of the gas pressure.

This brings us to another important aspect of the present invention. It consists in that the first reduction stage is carried out at the pressure which is required for the washing with pressure water. For example, according to the invention, the reaction between the iron ore and the solid carbon may take place at a pressure of 10 atm. This method offers the substantial advantage that the reducing gas is formed in the reduction chamber at the elevated pressure, whereby a mechanical condensation of the gas is not necessary. It is merely necesary to feed the solid reactants, iron ore and coal, into the reduction chamber at the pressure of, for example, 10 atm. The gas leaving the reduction chamber through an adjustable throttle valve with a pressure of, for example, 10 atm, is cooled to about 20° C., and is then conveyed to the pressure-water wash where its carbon dioxide and steam content are removed, to the extent that the steam did not previously precipitate during the preceding cooling.

A further development of the present invention resides in that the reducing gas obtained during the pressure-water wash is used at approximately the same pressure which was established in the first reduction stage. This has the primary advantage that the heat exchanging conditions are improved when the reducing gas is heated to the reducing temperature, and that, as a result of the pressure, the reduction in the second reduction stage is accelerated.

Particularly, favorable results are obtained if, according to the invention, the waste gas from the second reduction stage is also introduced into the pressure-water wash, after it has been cooled appropriately in countercurrent. This method produces the result that practically only carbon dioxide and steam occur as waste gases from the process. This means that the reducing agents used can be utilized up to 100%. Consequently, the process according to the invention has an extremely low consumption of reducing agents.

There are different variants of using the reducing gas obtained in the pressure-water wash from the waste gas of the first reduction stage. Said reducing gas, consisting mainly of carbon monoxide, may, for example, also be utilized for the process in that it is caused to react, at a temperature of about 550 to 650° C., with the iron ore which was partly reduced in the first reduction stage. Owing to the decomposition of the carbon monoxide, carbon is separated in known manner. During the subsequent heating of the mixture, composed of partly reduced ore and carbon (resulting from said decomposition), to about 900° C., by using the reactor cooling heat as proposed by the invention, the desired final reduction of the iron ore takes place. Such a use of highly active carbon resulting from the decomposition of carbon monoxide is known per se and is described, in German Patent 1,086,256.

The second of the two-stage methods consists in that the fuel, for example, coke, is gasified by means of $CO_2$ and/or $H_2O$ at temperatures between about 500° C. and about 1000° C. while being heated by reactor heat in any of the above-described manners, to form a mixture of $CO/CO_2$ or $CO/CO_2$ and/or $H_2/H_2O$. This gas is then reacted with the iron ore; this again produces a gas mixture rich in $CO_2$ or in $CO_2/H_2O$ which, when recycled, is mixed with the gasifying medium for the fuel. The first stage and the second stage of said gasifying and reducing process can be arranged in close adjacent relationship in a reaction chamber, so that they take place in the same reaction chamber in sub-sections thereof, which can be interconnected by gas-pervious walls or by special ducts. But the stages may also be completely separated in such a manner that the gas is pumped between the different reaction chambers for the gasification and for the reduction of ore.

The present invention further applies to measures which serve the purpose of improving the reducing process, specifically in the first reduction stage or in the gasification stage. Of special importance are measures for accelerating the conversion in the first reduction stage. An important measure consists in the use of an excess of the solid reducing agent. The invention contemplates operating with about 30 to 100% excess of reducing agent in relation to the amount of carbon converted. The excess carbon is separated from the material being reduced after leaving the reduction mixture in a manner known per se and is recycled as a reducing agent to the ore to be reduced. The separation may be carried out, in a manner known per se, by magnetic separation or the like. Such separation may be effected between the first and the second reduction stage. In the event that magnetic separation is used, it is necessary to cool the intermediate product below the Curie point. Otherwise, the excess carbon is removed from the final product of the reduction after the second reduction stage and after having been cooled to normal temperature. It is necessary to separate the ash from the excess carbon prior to its being returned to the ore to be reduced. This can be done in that a part of the excess carbon is shunted off continuously and is used elsewhere, for example, it is burned in a boiler. In this case, the ash content in the material used increases with respect to the ash of the coal originally fed to the process, namely, in a proportion determined by the quantitative ratio of the carbon removed to the carbon originally used. According to the invention, the ash may also be removed from the cycle by suitable preparation of the recycled excess carbon, for example, by an electrostatic preparation process in which the ash can be largely separated from the carbon.

An important measure according to the invention, for accelerating the reactions in the first reduction stage or in the gasification stage consists in the use of particularly reactive reducing agents. Preferred are low temperature coke, so-called "Schwelkok," as well as activated coke, whose activation is effected, for example, by the treatment of coke with steam at elevated temperature in a manner known per se, as well as those kinds of carbon products which, by nature, are particularly reactive, such as charcoal and carbon which is obtained from the decomposition of carbon monoxide.

If bituminous coals are used directly as the reducing agent in the first reduction stage or in the gasification stage, the heating according to the invention is carried out in such a manner that the degassing of the carbon or its coking is carried out to obtain a very reactive coke. This is done by using known measures, such as: maintaining a particularly favorable temperature-time program during the degassing; treatment with steam during the heating; the suppression of the agglomeration of the carbon substances by interposing oxygen yielding substances, such as, for example, iron ores.

Still another important measure for accelerating the reduction in the first reduction stage or in the gasification stage consists in the use of auxiliary substances which are added to the material to be reduced. Such known auxiliary substances include, for example, potassium carbonate, sodium carbonate, calcium carbonate, and the like. An advantageous reducing process is obtained, for example, by mixing up to 5% sodium carbonate, for example, as an aqueous solution, with the reducing carbon products.

The introduction of gaseous auxiliary agents into the reduction vessel for carrying out the first reduction stage or in the gasification stage was found to be expedient in the invention. A suitable gaseous auxiliary agent is, for example, sulfurous acid, which may be present in the reducing waste gas in an amount of about up to 3%. It was further found that it is an important measure to introduce hydrogen or hydrogen carriers into the reaction chamber for carrying out the first reduction stage. According to the invention, hydrogen, steam and/or decomposable hydrocarbons may be added for this purpose.

FIG. 6 is a diagrammatic illustration of an important embodiment of the process according to the invention. In FIG. 6 are shown the temperatures at the various stages of operation. In this embodiment, the iron ore and the reducing carbon, to which may be added desulfurizing admixtures, such as, for example, calcium carbonate and dolomite, as well as reaction accelerators, such as, for example, sodium carbonate are crushed to a grain size of less than 0.5 mm. and are mixed. The mixture is formed into pellets or briquets by adding a binder, such as, for example, bentonite. The pelletizing or briqueting of the mixture may be carried out in roll presses in a known manner. The size and the shape of the briquets are such that the path for the heat transfer from the outside surface to the interior of the briquets remains small and that, on the other hand, sufficiently large spaces are formed in the mass of briquets to offer as little obstruction as possible to the passage of the gases through the briquets. For example, briquets having a volume of about 20 cm.³ are suitable for this purpose. The volume should range between about 10 cm.³ and about 50 cm.³. The mixed briquets are produced in a pelletizing plant 11 and are conveyed into the reaction vessel by means of a known gas-tight lock 12. A pressure in the range of 5 to 50 atm., for example, about 10 atm. is maintained in the reaction vessel. Sequentially arranged in the latter is a heating chamber 13 for heating the briquets, and a chamber 14 for carrying out the first reduction stage. The latter is followed by a chamber 15 for carrying out the ore/gas reaction, the so-called second reduction stage. The chamber or reactor 15 is followed by a cooling chamber 16 for cooling the solid reaction material after it has been discharged from the chamber 15. Said discharge is effected through gas-tight locks 12″ in a manner known per se.

In the embodiment of FIG. 6, the material to be reduced, after having entered the reaction vessel, is heated by indirectly utilizing the heat from the atomic reaction. The invention provides for a device 17 for cycling a heat exchanging medium which absorbs the heat from the material in counter-current in the cooling chamber 16 and delivers same also in countercurrent, to the fresh charge, in this case, to the briquets in the heating chamber 13. Cooling and heating may be carried out indirectly by a pipe system or by direct contact, the piping system being appropriately disposed in the reaction chamber and being traversed by the heat transfer medium. The heat transfer medium is preferably a fluid medium with very high thermal capacity. Carbon dioxide may, for example, be used for this purpose, as well as liquid metals, such as liquid lead or liquid sodium or alloys thereof. A rotary pump 18 is provided in the coldest portion of the cycling device 17. However, the heat transfer may also be carried out without a pipe system in the reaction chamber, in that a gaseous heat exchanging medium is guided directly through the charge. Such gaseous heat exchanging media include, above all, the gases forming during the reaction that takes place in the reduction vessel, i.e. specifically mixtures of carbon monoxide, carbon dioxide, hydrogen and steam.

The heating of the first and second reduction stage 14 and 15 in the reaction vessel is effected by the heat transferred during the cooling of the atomic reactor. In the present case, the reactor heat is transferred, in the recycle device 4 in the heat exchanger 2 to a fluid heating agent which is passed through recycle device 5 and first stage ore/coal reduction chamber 14 and through the second stage ore/gas reduction chamber 15 where it transfers its heat to the reaction mixture.

The fluid heating agent may yield its heat indirectly to the material in the reactors or chambers 14 and 15, in that the heating agent flows through a pipe system arranged, respectively, in the reactors 14 and 15. However, it is particularly advantageous to dispense with such a pipe system and to guide the heating agent directly through the mixture to be reduced, so that the fluid heating agent yields its heat directly to the solid reaction material. In this case, a particularly suitable fluid heating agent is a gas mixture of carbon monoxide, carbon dioxide, hydrogen, and steam; a mixture which is formed during the reduction of the iron ore.

In the present embodiment, low temperature coke reduces a hematitic ore containing about 64% Fe in the first reduction stage 14 to about 65% oxygen removal at a mean temperature of about 850° C. In the second reduction stage, a further oxygen removal up to about 85% is carried out by means of gas reduction at a mean temperature of about 900° C.

Having left the ore/gas reactor 15, the reaction product is conveyed to the cooling chamber 16 and, thereafter, to a magnetic separation device 19. If necessary, magnetic separation may be carried out, in a manner known per se, after the product to be separated has been subjected to preliminary crushing. In this way, the iron sponge, which has in this case a reduction degree of about 85%, is separated from the excess carbon and from the ash. The resulting iron sponge 21 is then processed in a manner known per se. The excess carbon 22 is recovered from the carbon/ash mixture by known measures, namely, in such a manner that the ash 23 is removed with an economically acceptable residual content of carbon, for example, with a content of 20% of combustible constituents. The excess carbon that has been separated in separator 20 is admixed with fresh ore 24 as a reducing agent.

The gases of the first reduction stage resulting from the reaction between the iron ore and the carbon in the first stage ore/carbon reactor 14 are removed by way of special outlet members 25 and are extensively freed of their carbon dioxide and steam content, for example, to a residual content of 2%, in suitable apparatus as will be explained hereinafter. The gas flows through a heat exchanger 26 and a cooling device 27, in which the gas is cooled to a temperature of about 20° C. In the present embodiment, the gas is then purified with pressure water in the wash chamber 28, where carbon dioxide 29 and steam are removed, except for residues. The purified gas is circulated by means of a rotary blower 30 through heat exchanger 26 into the ore/gas reactor 15. After having performed the reducing operation, said stream of gas is removed from the reaction vessel 15 through special gas outlet members and is also conveyed to the exchanger 26, the cooler 27 and the wash chamber 28 for eliminating carbon dioxide and steam.

The individual chambers 14, 15 of the reaction vessel described in FIG. 6 may consist of separate vessels, in which case the reacting solid mixture is transferred from one vessel to the other by suitable means. This arrangement is, for example, appropriate when the reactions are carried out in turbulent state, for example, as fluidized bed reactors. In this case, it is expedient to arrange, in a manner known per se, separate fluidized beds for the heating, for carrying out the first reduction stage, for carrying out the second reduction stage and for the cooling stage, either in superposed or juxtaposed relationship.

Figure 7:
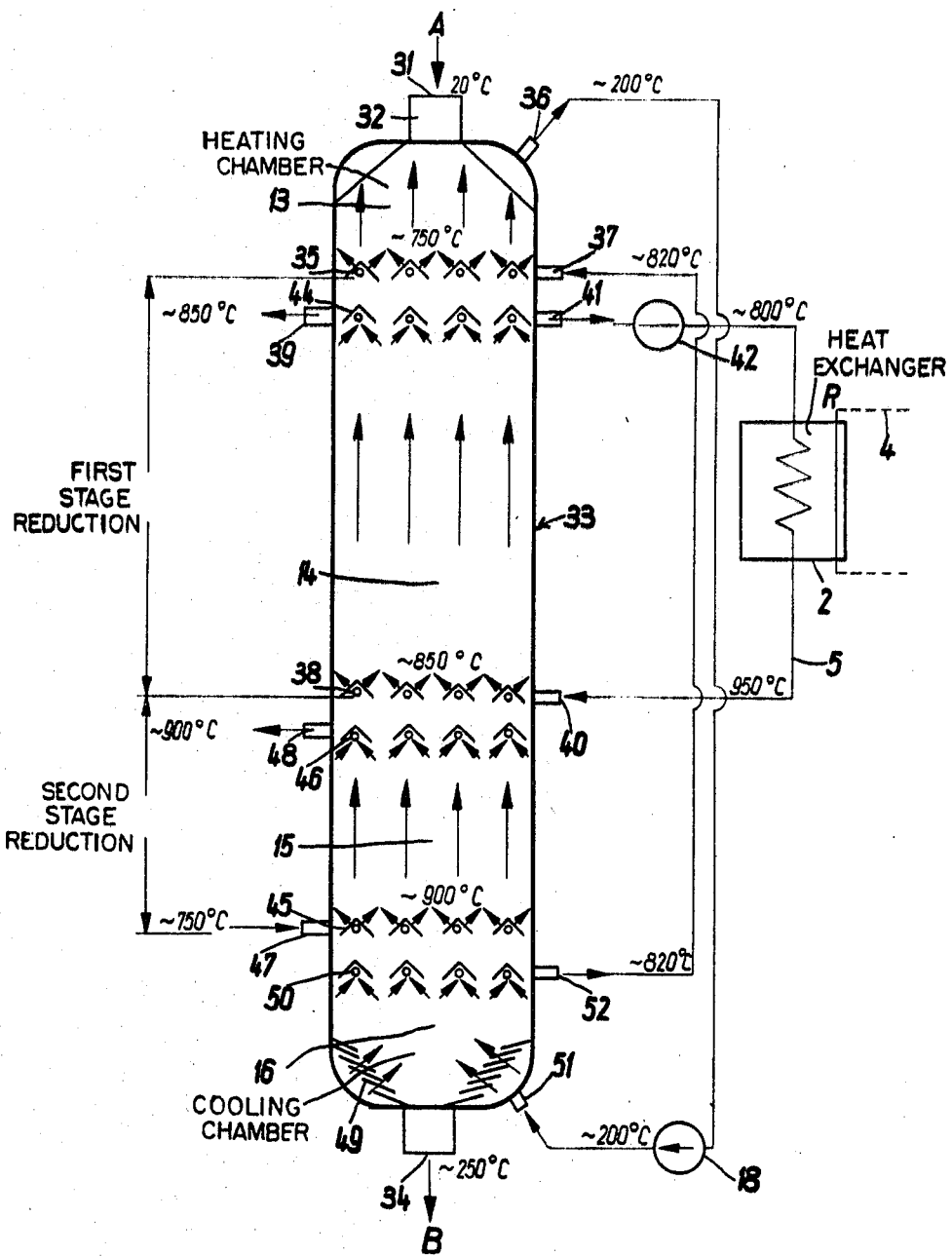
FIGURE 7 is a diagrammatic illustration of a reaction vessel in which a fluidized bed is formed.

A particularly simple embodiment of the process according to the invention is obtained if the partial processes are carried out in a single shaft-like reaction vessel. This embodiment is particularly advantageous if a fixed bed of pelletized material is moved through the shaft from the top to the bottom and if the partial processes are carried out on said material when it travels through the shaft. FIG. 7 is a diagrammatic view of such a reaction vessel according to the invention. In FIG. 7 are shown the various temperature at the different stages of operation. At its upper end, the reaction vessel comprises an inlet opening 31, through which the reaction mixture A is introduced into the reaction vessel 33 after having passed through a pressure lock 32. At the bottom end is an outlet opening 34, through which the reduced material B is removed from the reaction vessel 33 and is fed to a pressure lock. The heating chamber 13 is in the top portion of the reaction vessel 33. A heating medium cnosisting of a $CO/CO_2$ mixture is introduced into said heating chamber 13 by means of roof-like gas inlet members 35. The heating medium transfers its heat in countercurrent to the material to be heated and leaves the reaction vessel through the outlet 36. The cycled heating medium, after having been reheated by the heat of the reduced material in cooling chamber 16, is again fed to the reaction vessel 33 at 37.

Located below the heating chamber 13 of the reaction vessel 33 is the ore/carbon reaction chamber 14 of the first stage. A heating medium consisting of a mixture of CO/CO$_2$ or CO/CO$_2$/H$_2$/H$_2$O is blown into said reaction chamber 14 through the roof-like distributing members 38 at the lower end of the first stage and is withdrawn at the upper end of said first stage through the roof-like gas collecting members 44. The heating medium enters the reaction vessel 33 at inlet 40 and leaves the vessel at outlet 41. The heating medium after having transferred heat to the reaction material in the first stage is fed to a rotary pump 42 and is urged through the heat exchanger 2, where it absorbs the heat from the cooling medium of the atomic reactor as cycled through device 4. The reaction between the iron ore and the carbon forms a continuous excess of reducing gases in the reaction chamber 14. Said excess is removed from the reaction vessel 33 through the outlet 39.

Located below the first reaction chamber 14 is the second reaction chamber 15 i.e. the ore/gas reaction chamber, wherein the partially reduced ore is further reduced by means of reducing gases. The reducing gases are blown into the reaction chamber 15 at the lower end thereof through the roof-like distributing members 45 and are withdrawn at the upper end of said chamber through the roof-like gas collecting members 46. These gases are introduced into the reaction vessel 33 through the inlet 47 and are withdrawn through the outlet 48.

The cooling chamber 16 is disposed at the lower end of the reaction vessel 33. The cooling medium, which also serves as the heating medium for the charge at the heating chamber 13 of the reaction vessel 33, is blown into said cooling chamber 16 through grate-like members 49.

The roof-like gas collecting members 50 are located at the upper end of the cooling chamber 16. The cooled heating medium from the first reduction stage is fed into the reaction vessel 33 through the inlet 51 and is removed from the outlet 52, the rotary pump 18 being located in the coldest part of the circuit.

A pressure gradient from bottom to top must be maintained in each of the chambers 13, 14, 15, 16. This is illustrated by the temperature values shown in FIG. 7 of the drawing. In addition, it is expedient to insure, if possible, that no gas flows from the adjacent chambers into the reaction chamber 15, by providing appropriate pressure conditions at the inlet and outlet of the various reaction chambers.

The process according to the invention, as defined in FIGS. 6 and 7, permits carrying out developments and improvements in various respects. Such improvements relate to the manner of development of the heat transfer conditions. When gaseous heat exchanging media are used, the comparatively low temperature gradient between the heating chamber 13 and the reaction chamber 14 makes it possible that the amounts of gas to be circulated become comparatively large and it therefore becomes expedient to keep the resistance to the passing gases in the reaction chamber 14 as low as possible. Such measures may consist in the use of a spherical, generally abrasion-resistant reaction material, for example, in the form of pellets. Moreover, the gas cycle may be enriched with constituents of high thermal capacity, such as methane or fine-grained carbon, for example, carbon which has been separated as carbon black from hydrocarbons or carbon obtained from the decomposition of carbon monoxide. Moreover, in case of high gas velocities, it is expedient to keep the layer through which the gas is to flow as small as possible. This result can advantageously be obtained by the use of a crosscurrent apparatus, in which the solid material is moved from top to bottom and the gas is moved horizontally.

The cooperation of the reducing apparatus with the atomic reactor can be made particularly advantageous and effective in that the heat exchange between the reactor coolant and the heating agent for the reaction vessel is dispensed with. This means that the reactor coolant is at the same time the heating agent for the reaction vessel. In respect to this embodiment of the process according to the invention, there are provided known highly efficient separating members in the gas cycle between the atomic reactor and the reducing apparatus. Said separating members are adapted to remove the radioactive substances from the gas stream and thereby render impossible a transfer of harmful radiating substances from the atomic reactor to the material to be reduced.

The invention will next be described in conjunction with the following example.

The atomic reactor supplies a gaseous coolant having a discharge temperature of 1050° C. The reactor coolant transfers its heat in a steel heat exchanger to a gaseous heating agent which, in the present case, is CO$_2$. The reactor coolant has a temperature of 1030° C. when entering the heat exchanger; its temperature upon leaving the heat exchanger is 780° C. The coolant is recycled to the atomic reactor at said temperature.

The heating agent is heated to a temperature of 1015° C. in the heat exchanger. It is conducted to an ore/carbon reactor, which it enters at a temperature of 1000° C. The heating agent flows through the ore/carbon reactor from bottom to top by being conducted through vertical pipes arranged in the reactor. The inside diameter of the pipes is 25 mm., the distance between adjacent pipes being 50 mm. The heating agent leaves the ore/carbon reactor at the upper end thereof at a temperature of 780° C. It is fed to the heat exchanger by means of a pump for the purpose of being reheated and has a temperature of 765° C. when entering said heat exchanger.

The free space in the ore/carbon reactor outside the pipes through which the heating medium flows, is filled with a reaction mixture consisting of pellets of small-grained iron ore and coke. The iron ore is composed of 93.5% Fe$_2$O$_3$, 3.7% SiO$_2$, 2.1% Al$_2$O$_3$, 0.7% CaO and has a grain size of 1–5 mm. comprising only 8% of grains smaller than 1 mm. The grain size of the coke also ranges from 1–5 mm. and comprises 13% of fine grains of less than 1 mm. The coke is of the type produced by coking a mineral coal having 26% volatile constituents at 700° C. The coke contains 1% anhydrous sodium carbonate, which was distributed in the coke in the form of an aqueous solution. The mixture of the reaction material is composed of 70% iron ore and 30% coke.

The reaction time, i.e. the residence time of the reaction mixture in the ore/carbon reactor, amounts to 6 hours. Within said time, 65% of the oxygen bound to the iron in the ore is decomposed and removed from the reaction chamber in the form of a gas. The reaction gas or the waste gas leaving the ore/carbon reactor, is composed as follows: 18% CO$_2$, 72% CO, 3% H$_2$O, 7% H$_2$. Its temperature upon leaving the ore carbon reactor is 750° C.

The mixture of ore reduced to the extent of 65%, and excess carbon, leaves the ore/carbon reactor, and is introduced in a hot state into a gas reduction reactor. In said reactor the reduced ore is traversed from bottom to top by a reducing gas composed of 89% carbon monoxide, 8% hydrogen and 3% CO$_2$+H$_2$O. This reducing gas was obtained from the waste gases of the reduction reactors by means of a washing process, in the course of which carbon dioxide and steam were removed, except for the above-mentioned residual content of 3%. The reducing gas enters the gas reduction reactor at a temperature of 900° C. and leaves the same at a temperature of 820° C.

In the gas reduction reactor, the oxygen content of the reaction mixture is reduced to such an extent that the final product has a degree of reduction of 88%. The cooled end product of the gas reduction reactor is fed to a magnetic separator, in which the excess carbon is separated from the iron sponge. The iron sponge, which has a grain size of about 0.5 to 4 mm., is briqueted in a roll press, and is then ready for use. 15% of the excess carbon is separated and is burned in a steam boiler for the purpose of removing ash from the cycle. 85% of the excess carbon is added again to the reaction mixture for entry into the carbon/ore reactor.

What is claimed is:

1. A process for the reduction of iron ore by a reducing agent comprising transferring heat produced in an atomic reactor to the ore and reducing agent by a coolant for said reactor, the reduction of the iron ore being effected to a degree of completion of about 40 to 75% in a first stage by heating the ore with solid carbon-containing reducing agents at a temperature between about 500° C. and about 1000° C. at an elevated pressure between 5 and 25 atmospheres, the final reduction of the ore being effected in a second stage until there is a residual oxygen content of about 5% to 15% by heating the ore with a reducing gas without cooling the intermediate product between the first and the second reducing stages, stage the gas produced in the first reduction stage being fed to a pressure-water wash for obtaining a reducing gas of carbon monoxide and hydrogen with a relatively small carbon dioxide and steam content, said latter reducing gas being used in the second reduction stage as a reducing agent.

2. A process according to claim 1 wherein the heat is transferred from the coolant to the ore and reducing agent by an auxiliary medium which is heated in a heat exchanger by the reactor coolant.

3. A process according to claim 2 wherein the material to be reacted is a fine-grained reaction mixture consisting of iron ore and said reducing agent, said reaction mixture being first preheated by means of the auxiliary medium and then being heated by said auxiliary medium at the temperature range of the reaction.

4. A process according to claim 2 wherein the auxiliary medium is a cycled gas, said medium being respectively heated in the heat exchanger by the reactor coolant and cooled by transfer of heat to the reaction materials, said medium being pumped in a cycle by a pump which is arranged in the coldest part of the cycle.

5. A process according to claim 2 wherein said auxiliary medium is a metal or metal alloy which is liquid in the temperature range of the reaction selected from sodium and alloys of sodium and potassium.

6. A process according to claim 1 wherein the second reduction stage is carried out at approximately the same pressure as the first reduction stage, the waste gas of the second reduction stage being also fed to the pressure-water wash, in order to be recycled into the second reduction stage after carbon dioxide and steam have been eliminated.

7. A process according to claim 1 wherein the gas obtained from the pressure-water wash is contacted with the reduction product of the first reduction stage in a carbon separating stage at a temperature between 550 and 650° C. for the purpose of separating carbon, the waste gas of said carbon separating stage being fed to the pressure-water wash, while the mixture of partly reduced iron ore and carbon is fed to the second reduction stage, where it is subjected to final reduction by being heated by heat generated by the cooling of the reactor.

8. A process according to claim 1 wherein the first reduction stage is carried out with an excess of solid reducing agents, the amount being between about 130% and about 200% of the amount of carbon converted in said stage, the process further comprising separating the excess carbon from the reduced material by magnetic separation, and feeding at least part of the separated carbon to the starting mixture of the first reduction stage.

9. A process according to claim 1 comprising maintaining the reaction material in a fluidized state by circulating the reaction gas formed during the reduction of the ore.

References Cited

UNITED STATES PATENTS

| | | | |
|---|---|---|---|
| 2,995,426 | 8/1961 | Keith. | |
| 3,227,546 | 1/1966 | Johnson et al. | 75—26 |
| 3,347,659 | 10/1967 | Volk et al. | 75—26 X |
| 1,403,576 | 1/1922 | Stansfield | 75—33 |
| 2,528,553 | 11/1950 | Royster | 75—35 |
| 2,547,685 | 4/1951 | Brassert et al. | 75—35 |
| 2,805,144 | 9/1957 | Stotler | 75—34 |
| 2,821,471 | 1/1958 | Sellers | 75—34 |
| 3,029,141 | 4/1962 | Sibakin et al. | 75—34 |
| 3,093,474 | 6/1963 | Collin | 75—35 |
| 3,109,781 | 11/1963 | Natland | 176—60 |
| 3,247,069 | 4/1966 | Powell et al. | 176—65 |
| 3,264,751 | 8/1966 | McEntee | 165—148 |
| 3,287,229 | 11/1966 | Peters | 176—65 |

FOREIGN PATENTS

| | | |
|---|---|---|
| 534,898 | 12/1956 | Canada. |
| 625,289 | 8/1961 | Canada. |
| 238,270 | 8/1925 | Great Britain. |

L. DEWAYNE RUTLEDGE, Primary Examiner

H. W. TARRING, Assistant Examiner

U.S. Cl. X.R.

75—33, 35; 176—39; 266—17